June 22, 1954   W. SIEVENPIPER   2,681,711
LUBRICATING DEVICE
Filed Sept. 29, 1950
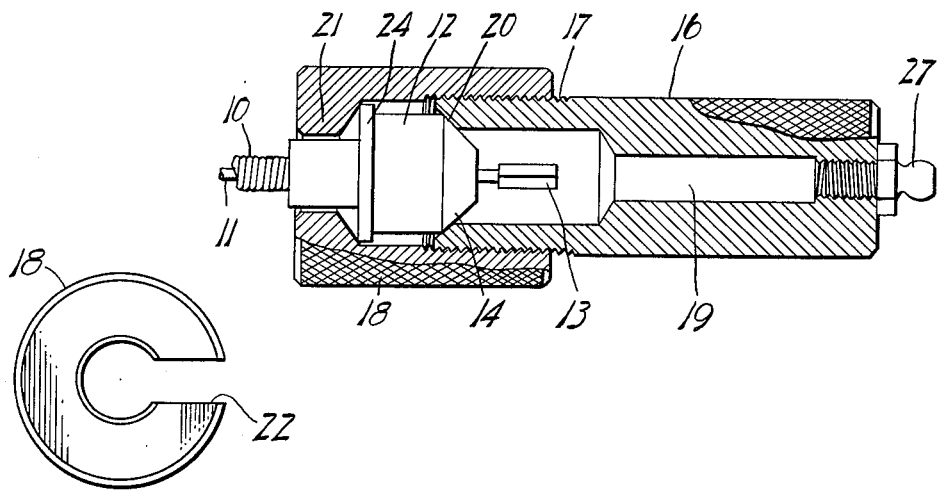
Fig. 1.
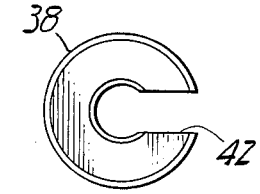
Fig. 2.
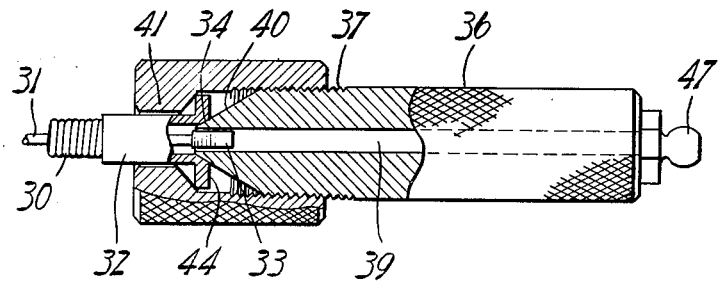
Fig. 3.
Fig. 4.
INVENTOR.
Ward Sievenpiper
BY
Bean, Brooks, Buckley & Bean
ATTORNEYS Patented June 22, 1954

2,681,711

UNITED STATES PATENT OFFICE 2,681,711

LUBRICATING DEVICE

Ward Sievenpiper, Alden, N. Y.

Application September 29, 1950, Serial No. 187,435

8 Claims. (Cl. 184—105)

This invention relates to lubricating devices and particularly to a lubricating device for speedometer drive cables or chains or similar flexible drive devices.

In speedometer drive cables and like devices where an elongate flexible driving element is encased in a flexible tubular casing or sheath, it is common practice to apply lubricant in the form of grease to the cable, then thread it into the casing or sheath. This is a messy, awkward, and time-consuming task, and the results are frequently not entirely satisfactory.

The present invention provides means which render it unnecessary to remove the cable from its sheath to effect lubrication and further provides means for applying full pressure lubrication to the interior of the sheath with the flexible cable encased in assembled position therein.

The device of the present invention may vary as to form, particularly as such variations may be required to adapt the device to the various forms of end fittings which are found on the encasing sheaths of flexible drive members of the kind here under consideration. Speaking generally, the device of the present invention is assembled with an end fitting of the sheath, by very simple manipulation, in such manner as to provide a closed grease chamber in fluid-tight communication with the interior of the sheath, the device being provided with a lubricant fitting of the Alemite type or the equivalent for pressure lubrication of the interior of the sheath by way of the aforesaid grease chamber.

Various mechanical modifications and variations of the device of the present invention may be made without departing from the principles of the present invention, the scope of which is limited only as defined in the appended claims. However, complete embodiments of the invention are illustrated in the accompanying drawing and described in detail in the following specification by way of example.

In the drawing:

Fig. 1 is a longitudinal cross-sectional view of one form of the device of the present invention shown assembled for use;

Fig. 2 is an end view of a nut or clamp element of the device of Fig. 1;

Fig. 3 is a view similar to Fig. 1, but showing a modified form of the device adapted to handle another type of flexible drive casing end fitting; and Fig. 4 is an end view of a nut or clamp element of the device of Fig. 3.

Referring to the form of the device of the present invention illustrated in Fig. 1, the numeral 10 designates a flexible sheath which houses a flexible rotary drive shaft or cable 11. The numeral 12 designates a fitting which is fixed to one end of sheath 10 and is one conventional form of a variety of similar devices for mounting and securing the ends of speedometer drive cable housings. The drive cable 11 projects from fitting 12 as shown in Fig. 1 and may have at its ends a square, flattened or other non-circular element 13 for driving connection.

In the present instance the connection 13 is for establishing driving engagement with a rotating part of an automotive transmission, and fitting 12 has a beveled or frusto-conical face 14 which seats in a complementary recess in the wall of the transmission housing. In one form of speedometer drive housing the fitting 12 is retained with its beveled face 14 in fluid-tight relation with the seat in the wall of the transmission housing by means of a U-shaped clamp plate (not shown).

The device of the present invention comprises essentially a cylindrical element 16 having external threads at one end thereof, as at 17, and an internally threaded sleeve member 18 which engages the threads 17 of cylindrical member 16. Member 16 has an axial passage 19 extending therethrough which may be variously proportioned to accommodate different types of flexible drive assemblies, and, in the present instance, is provided with a beveled seat as at 20 in Fig. 1 to receive the beveled face 14 of fitting 12.

The internally threaded sleeve member 18 has an inwardly directed flange or abutment portion 21 at one end and is provided with a lateral slot 22, as shown in Fig. 2, of sufficient width to freely pass sheath 10. In assembling the device, beveled face 14 is placed against seat 20 of cylindrical member 16, sleeve element 18 is engaged over sheath 10 by means of slot 22, and sleeve element 18 is then moved axially toward and threaded upon cylindrical member 16 until the abutment portion of sleeve element 18 engages fitting 12 to urge it into firmly seated relation with respect to seat 14. In the illustrated instance, abutment portion 21 engages a flange 24, which is conventionally found on certain forms of speedometer cable sheath end fittings.

The end of passageway 19 opposite to the end which is provided with seat 20 is internally threaded and provided with a lubricant fitting 27 of the Alemite type for receiving the nozzle of a pressure lubricating gun. Obviously, lubricant forced into bore 19 through fitting 27 is transmitted under pressure to the interior of sheath 10 through the annular opening which occurs about cable 11 where it passes into the outer end of fitting 12.

Certain flexible drive casings are provided with internally beveled seats, and an example of a lubricating device to be use in conjunction with such fittings is illustrated in Figs. 3 and 4. In Fig. 3 the numeral 30 designates a flexible sheath which houses a flexible rotary drive shaft or cable 31. The numeral 32 designates a fitting which is fixed to one end of sheath 30 and represents another conventional form of device for mounting the ends of speedometer cable housings. The drive cable 31 projects from fitting 32 as shown in Fig. 3 and, as in the previous instance, may have at its end a square or flattened element 33 for driving connection.

In the present instance the connection 33 is for establishing driving engagement with the drive element of a speedometer mechanism, and fitting 32 has an internally beveled or frusto-conical face 34 which seats against a complementary beveled projection on the speedometer casing or mounting. In one form of speedometer drive housing the fitting 32 is retained in fluid-tight relation with the speedometer housing by means of a gland nut (not shown).

As in the previously described embodiment, the device of Figs. 3 and 4 comprises essentially a cylindrical element 36 having external threads at one end thereof, as at 37, and an internally threaded sleeve member 38 which engages the threads 37 of cylindrical member 36. Member 36 has an axial passage 39 extending therethrough which may be variously proportioned to accommodate different types of flexible drive assemblies, and, in the present instance, is provided with a beveled end as at 40 in Fig. 3 to seat in the beveled recess 34 of fitting 32.

The internally threaded sleeve member 38 has an inwardly directed flange or abutment portion 41 at one end and is provided with a lateral slot 42, as shown in Fig. 4, of sufficient width to freely pass sheath 30. In assembling the device, beveled seat 34 is placed against the beveled end 40 of cylindrical member 36, sleeve element 38 is engaged over sheath 30 by means of slot 42, and sleeve element 38 is then moved axially toward and threaded upon cylindrical member 36 until the abutment portion of sleeve element 38 engages fitting 32 to urge it into firmly seated relation with respect to seat 34, all as previously described in conjunction with Figs. 1 and 2. In the illustrated instance, abutment portion 41 engages a flange 44, which is conventionally found on certain forms of speedometer cable sheath end fittings.

The end of passageway 39 opposite to the end which is provided with seat 40 is, as in the previous embodiment, provided with a lubricant fitting 47 of the Alemite type and the manner of use is the same as in the case of the device of Figs 1 and 2.

Of course, it will be necessary to provide a variety of devices to take care of various standard automotive speedometer cable end fittings, and other devices constructed generally to the principles of the present invention may be provided to fit other flexible drive cable and casing assemblies, as may be desired.

What is claimed is:

1. A lubricating device for flexible drive means of the kind comprising an elongate flexible drive cable, a tubular encasing sheath therefor and an enlargement at one end of said sheath for mounting the drive means for use, said lubricating device comprising, in combination, an elongate body member having a formation at one end for annular seating engagement with the outer end of said enlargement, external threads on said body member at said end of a diameter greater than said enlargement, a generally cup-shaped clamp member having internal threads at one end for cooperation with the threads of the body member, a longitudinal slot in said clamp member for assembly of said clamp member laterally over the sheath, and also having a flange portion adjacent to its other end projecting radially inwardly to engage against the inner end of said sheath enlargement upon axial movement toward the body member, a longitudinal lubricant passage in said body member having a discharge portion within said annular seating formation for communication with the interior of the sheath, and a lubricant fitting at the other end of said body member in communication with said fluid passage.

2. A lubricating device for flexible drive means of the kind comprising an elongate flexible drive cable, a tubular encasing sheath therefor and an enlargement at one end of said sheath for mounting the drive means for use; said lubricating device comprising, in combination, a body member having a formation for annular seating engagement with the outer end of said enlargement, external threads on said body member lying outside of said enlargement, a clamp member having internal threads for cooperation with the threads of the body member, said clamp member having a portion projecting radially inwardly toward the sheath to engage the inner end of said enlargement, and a longitudinal slot in said clamp element for assembly laterally over the sheath, a lubricant passage in said body member having a discharge portion within said annular seating formation for communication with the interior of the sheath, and a lubricant fitting on said body member in communication with said fluid passage.

3. In a lubricating device, in combination, a body member and a generally cylindrical clamp member, said members having complementary annular thread formations for assembly in end-to-end relation, a lubricant chamber in said body member terminating adjacent to the threaded end thereof in a frusto-conical formation concentric with and of less radius than the threads, a pressure lubricant fitting carried by said body member and in fluid communication with the lubricant chamber, said clamp member having a clamp flange formation at one end extending radially inwardly, and an elongate slot through the wall of said clamp member extending substantially from end to end thereof.

4. In a lubricating device, in combination, a body member and a clamp member, said members having complementary thread formations for assembly in end-to-end relation, a lubricant chamber in said body member terminating adjacent to the threaded end thereof in an annular seating formation concentric with and of less radius than the threads, a pressure lubricant fitting carried by said body member and in fluid communication with the lubricant chamber, said clamp member having a clamp formation extending radially inwardly relative to the clamp body, and a longitudinal slot through the wall of said clamp member extending substantially from end to end thereof.

5. In a lubricating device, a generally cylindrical member having a longitudinal passage therein and being externally threaded at one end, a concentric frusto-conical formation at the threaded end lying radially within the threads, a cooperating clamp nut comprising an internally threaded sleeve having an end wall at one end thereof and a longitudinal opening extending entirely along the sleeve portion and extending into said end wall and terminating in a central opening therein, and a pressure lubricating fitting in communication with said longitudinal passage.

6. In a lubricating device, a generally cylindrical member having a longitudinal passage therein and being externally threaded at one end, a pressure lubricant fitting at the opposite end of said member in communication with said longitudinal passage, a concentric frusto-conical formation at the threaded end lying radially within the threads, and a cooperating clamp nut comprising an internally threaded sleeve having an end wall at one end thereof and a longitudinal opening extending entirely along the sleeve portion and extending into said end wall and terminating in a central openings therein.

7. In a lubricating device, a generally cylindrical member having a longitudinal passage therein and being externally threaded at one end, a concentric annular seating formation at the threaded end lying radially within the threads, a cooperating clamp nut comprising an internally threaded sleeve having an end wall at one end thereof and a longitudinal opening extending entirely along the sleeve portion and extending into said end wall and terminating in a central opening therein, and a pressure lubricant fitting in communication with said longitudinal passage.

8. In a lubricating device, a generally cylindrical member having a longitudinal passage therein and being externally threaded at one end, a pressure lubricant fitting at the opposite end of said member in communication with said longitudinal passage, a concentric annular seating formation at the threaded end lying radially within the threads, and a cooperating clamp nut comprising an internally threaded sleeve having an end wall at one end thereof and a longitudinal opening extending entirely along the sleeve portion and extending into said end wall and terminating in a central opening therein.

References Cited in the file of this patent

UNITED STATES PATENTS

| Number | Name | Date |
| --- | --- | --- |
| 787,154 | Delehant | Apr. 11, 1905 |
| 2,515,611 | Preszler | July 18, 1950 |

FOREIGN PATENTS

| Number | Country | Date |
| --- | --- | --- |
| 17,810 | Great Britain | of 1913 |